United States Patent [19]
Mohn

[11] Patent Number: 5,295,848
[45] Date of Patent: Mar. 22, 1994

[54] RELEASABLE HYDRAULIC AND/OR ELECTRIC CONNECTION FOR SUBSEA EQUIPMENT

[75] Inventor: Frank Mohn, London, England

[73] Assignee: Framo Development (UK) Limited, London, England

[21] Appl. No.: 920,320

[22] PCT Filed: Feb. 19, 1991

[86] PCT No.: PCT/GB91/00246
§ 371 Date: Aug. 19, 1992
§ 102(e) Date: Aug. 19, 1992

[87] PCT Pub. No.: WO91/13233
PCT Pub. Date: Sep. 5, 1991

[30] Foreign Application Priority Data

Feb. 20, 1990 [GB] United Kingdom ............... 9003790

[51] Int. Cl.⁵ .......................................... H01R 13/64
[52] U.S. Cl. ................................. 439/247; 439/191
[58] Field of Search ......................... 439/246-248, 439/191, 192, 195, 376

[56] References Cited

U.S. PATENT DOCUMENTS

4,188,050 2/1980 Lochte .
4,707,0411 11/1987 Kovit et al. ................ 439/246 X

FOREIGN PATENT DOCUMENTS

2138223 10/1984 United Kingdom .
2194980 3/1988 United Kingdom .
2196081 4/1988 United Kingdom .

Primary Examiner—Eugene F. Desmond
Attorney, Agent, or Firm—Young & Thompson

[57] ABSTRACT

A module is loaded on a submerged installation to interface an umbilical termination head with a pump module by way of vertically and horizontally directed connection units (21, 26) carried by the module and from which connection members are projected into respective receptacles (70). The units and the receptacles are mounted so as to be readily alignable to ball-and-socket joints (46) or universal couplings (74). The connection members can be projected in a first stage to effect alignment and in a subsequent stage to effect hydraulic and-/or electrical connection. The mounting of the units and receptacle is such as to permit retrieval of the module in the event of a failure to withdraw the connection members back into the units.

19 Claims, 6 Drawing Sheets section D-D

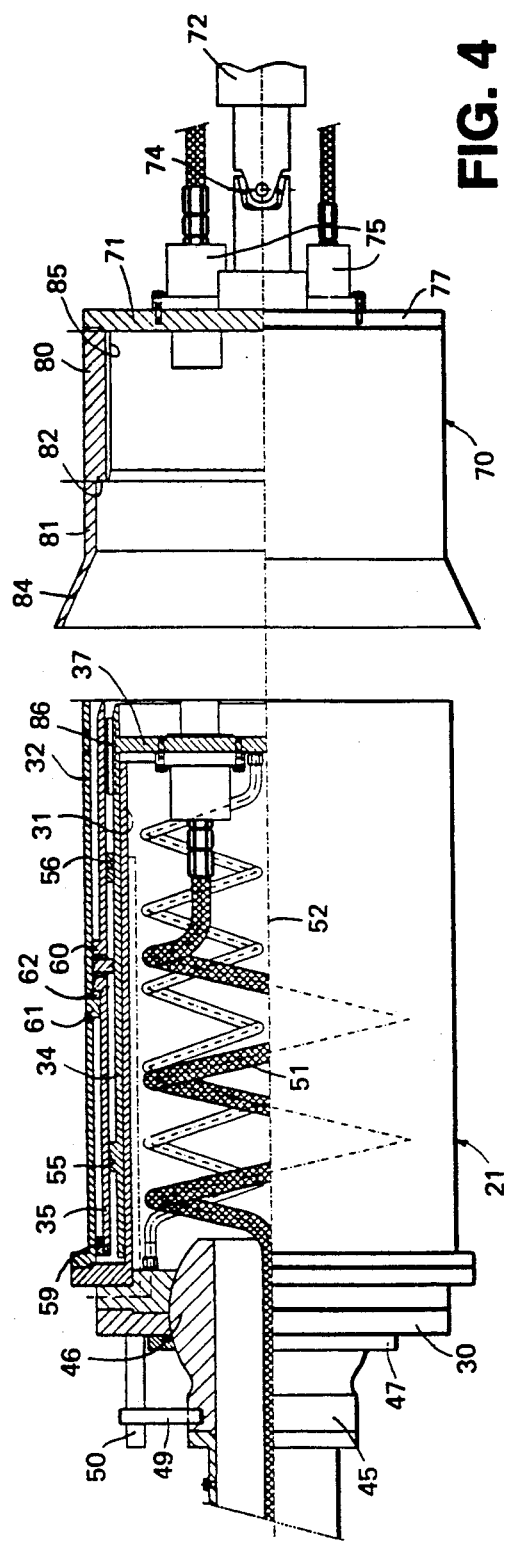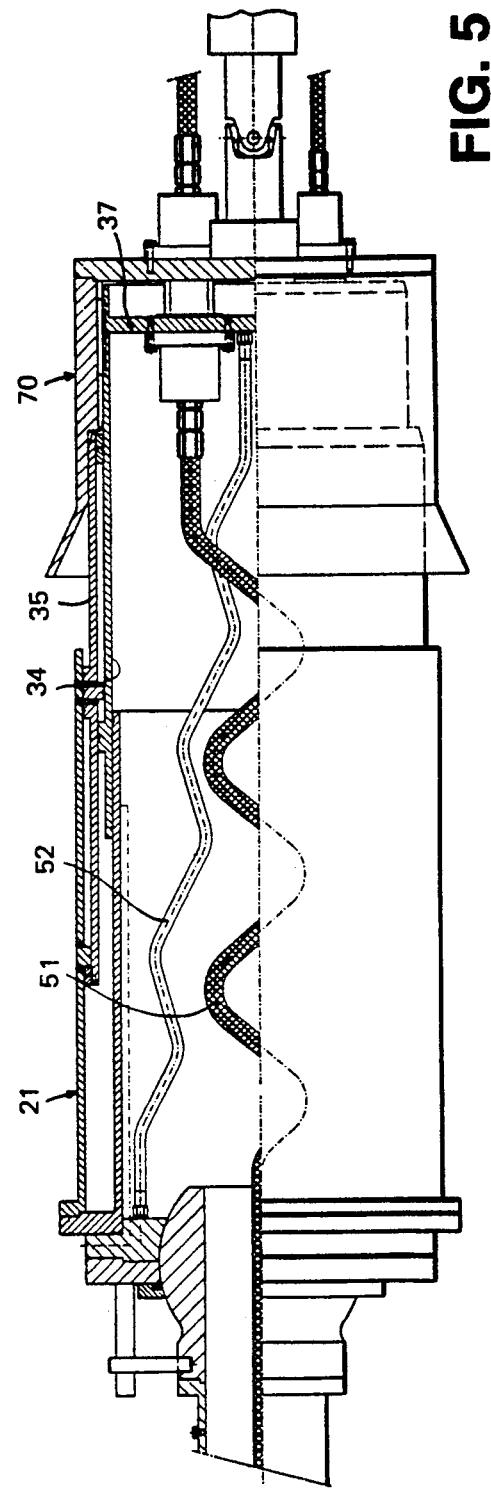

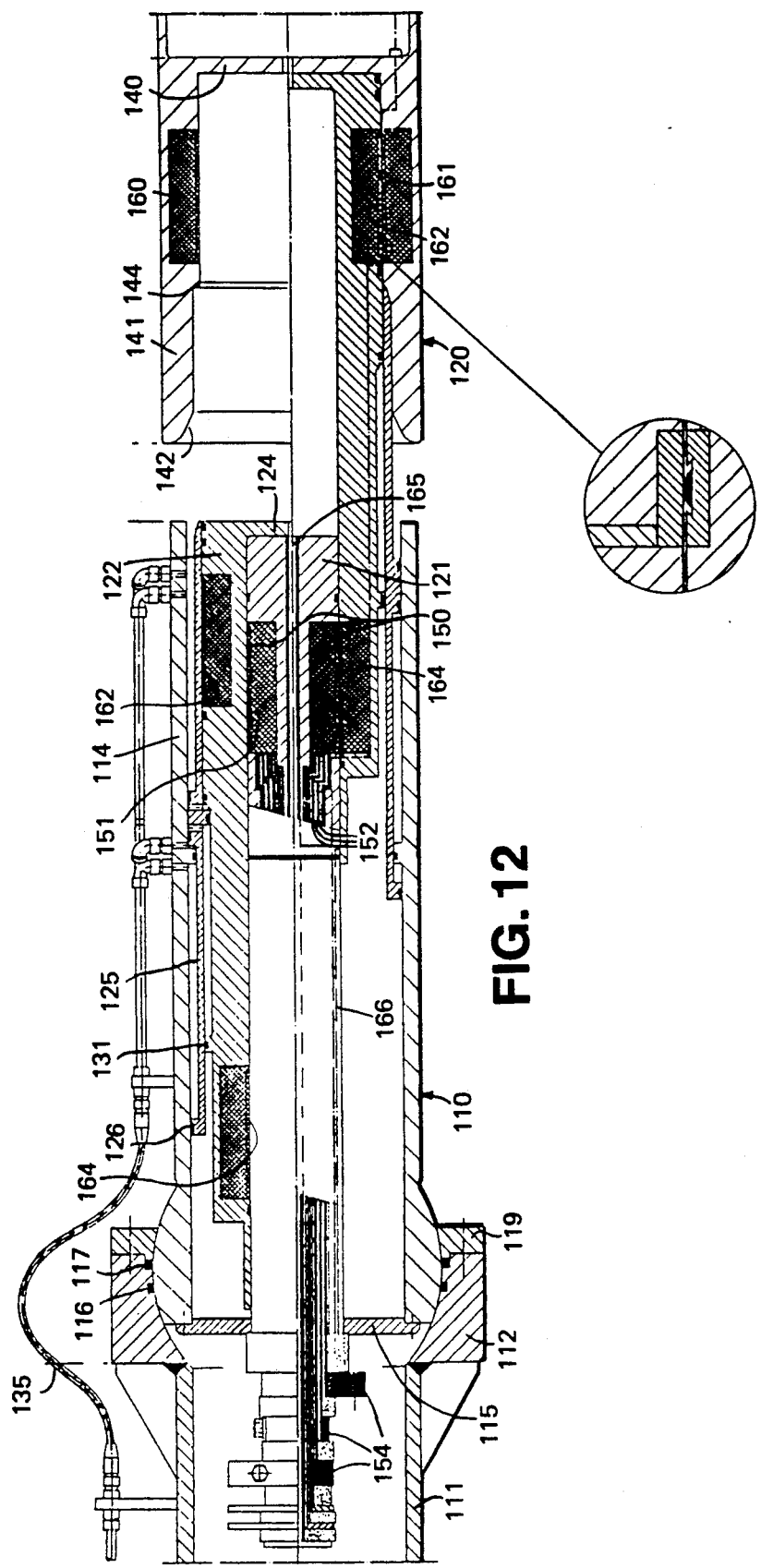

RELEASABLE HYDRAULIC AND/OR ELECTRIC CONNECTION FOR SUBSEA EQUIPMENT

The invention relates to systems for effecting electrical and/or hydraulic connections underwater.

In particular, the invention relates to systems for establishing such connections between a submerged installation and equipment which has been lowered down to it from the surface, for example, between subsea pumping equipment and a module which is lowered down to the equipment for establishing power and hydraulic fluid supplies to it and communication between it and surface equipment. Serious problems can arise in effecting the desired connections in such circumstances, due to misalignment of the parts to be connected, and the need to ensure integrity of the connections once they have been made.

The invention accordingly provides a connection system for effecting electric and/or hydraulic connection under water, the system comprising a connection unit and a receptacle which can be juxtaposed to permit a member carrying one or more connecting elements to be moved outwardly of the unit into the receptacle for mating the connecting elements with co-operating elements in the receptacle. The invention provides for the member and the receptacle to be self-aligning during the stroking of the member into the receptacle and for flexible mounting of the unit and the receptacle to accommodate any adjustment needed to correct misalignment. Thus the mounting of both the connection unit and the receptacle on the respective equipment items to be electrically and/or hydraulically connected can be effected by joints providing universal movement, for example, ball joints or universal couplings. The desired connection or connections are thus made without the use of external tooling, and alignment of the connection unit and the receptacle is effected and accommodated automatically during the advance of the connecting member into the receptacle.

To facilitate the orientation of the connection unit and the receptacle necessary for a satisfactory connection, the stroking of the connecting member can be divided into a first phase, during which the member and the receptacle interengage in such a way that alignment is achieved, and a second phase during which the actual electrical and/or hydraulic connections are established The connecting member can then comprise two parts capable of relative movement during stroking, of which an outer part has guide surfaces which act upon co-operating guide surfaces of the receptacle to effect alignment and an inner part carrying one or more connector elements which is advanced beyond the outer part to effect connection after alignment has been achieved.

A plurality of connector elements, which may comprise all electric connector elements, or all hydraulic connector elements, or more usually a mixture of the two, are mounted together on the connecting member, with appropriate co-operating connector elements received within the receptacle. Thus, the movement of the member to its final position within the receptacle effects a plurality of connections simultaneously. The connecting elements may comprise standard connector elements spaced across the member and the floor of the receptacle, in which event angular orientation means, for example a key receivable in a keybed, is provided to ensure correct positioning of the member and receptacle around the common axis. Instead, electrical connection can be established by way of one or more contact elements extending at least partially around the member, for engagement with cooperating contact elements set in the side wall of the receptacle.

However the connector elements are arranged, provision is made for flushing out seawater from the receptacle and for subsequently filling the region occupied by the connected contact elements with protective oil.

The invention can in particular be embodied in a power/control pod or module which can be lowered to a subsea installation for connection to the installation, and to an electrically driven pump unit supported thereby, of electrical power supplies, fluid supplies, and for the establishment of communication channels between the installation and the pump unit and surface equipment. The module can contain electronic equipment for processing electric power supplied to the electric motors of the pump unit, for controlling and supervising operation of the pump, and for providing to the surface equipment information about pump operation. The position of reciprocating pistons in the pump can be monitored by a closed loop monitoring system and hydraulic barrier fluid can be supplied or circulated from the surface through a hydraulic conduit in the power supply cable. Control signals for start-up and shut-down of the pump can be supplied to the pump unit by way of the module.

However embodied, the invention provides for the assembly together of two parts carrying connector elements in a simple and convenient way, even though the parts are not initially aligned along the axis along which they are relatively moved, and/or have different angular orientations. The connection, and also subsequent disconnection, does not require the use of additional tools, and disconnection can be effected simply by pulling the two parts apart, without the need for any unlocking operation. Thus a connection module lowered down to a subsea installation can, at the worst, be simply pulled away from it without causing damage.

The invention is further described below, by way of example, with reference to the accompanying drawings, in which:

FIG. 4 is a part-sectional side view of one of the connection systems, comprising a connector stroking unit carried on the module of FIG. 1 in position for stroking into a receptacle of a pump module supported at a subsea installation;

FIG. 5 is a view similar to that of FIG. 4 after stroking has been effected;

FIG. 12 is a sectional side view of an alternative connector system, which can replace either of the systems of FIGS. 4–7 and FIGS. 5–11 and which comprise a connector stroking unit and a receptacle, shown in the upper part in the initial position before stroking has been effected, and in the lower part after connection operation has been completed;

FIG. 13 is a fragmentary sectional view of contact elements included in the system of FIG. 12;

Figure 1:
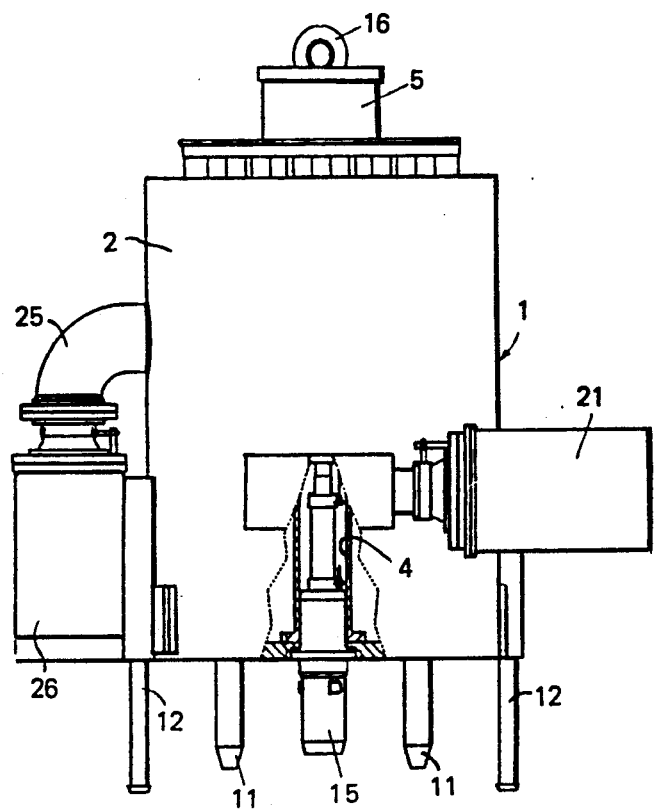
FIG. 1 is a side view of a power/control pod or module incorporating connection systems in accordance with the invention.
Figure 3:
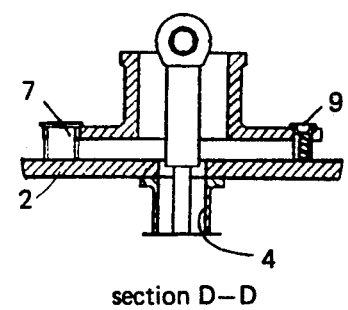
FIG. 3 is a partial sectional side view on line D—D of a portion of the module of FIG. 1.
Figure 2:
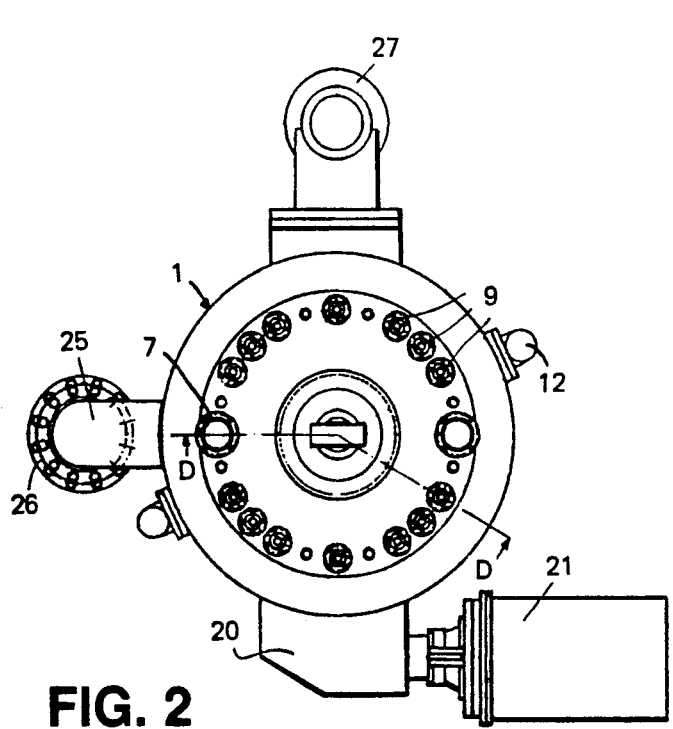
FIG. 2 is a plan view of the pod of FIG. 1.
Figure 6:
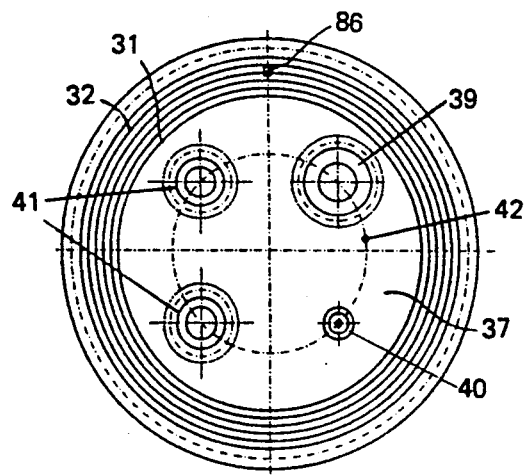
FIGS. 6 and 7 are end views of the opposed ends respectively of the connector unit and of the receptacle of FIGS. 4 and 5.
Figure 7:
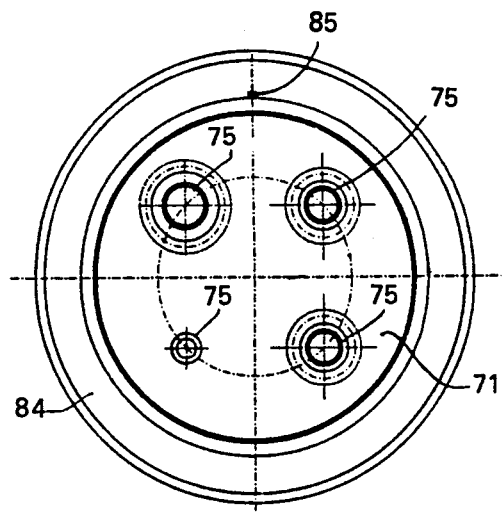

The power/control pod or module 1 illustrated in FIGS. 1, 2 and 3 comprises an upright cylindrical casing 2 with a central axial bore 4. At the top of the casing 2 there is provided a running tool interface 5 with a connection plate 6 having dowel pin receptacles 7 and connections 9 for hydraulic supplies, the hydraulic pipelines not being shown. Location dowels 11 extend downwardly from the lower end of the casing 2, as do shock absorbers 12 which are mounted externally. A lockdown connector 15 can be operated by a remotely operated vehicle (ROV) by way of an extension through the central bore 4, with a mechanical release loop 16 extending above the running tool interface 5. The casing 2 is designed to contain inert gas at for example 1 atmosphere pressure to protect electronic equipment within it.

A first tubular member 20 extends outwardly from the casing side wall to support a first cylindrical connector unit 21 which extends at right angles to the casing axis. A second tubular support member 25 also extends outwardly from the casing side wall to a second cylindrical connector unit 26 which however extends downwardly parallel to the casing axis.

Also extending from the casing side wall at a position diametrically opposed to the member 20 is a guide funnel 27.

Figure 14:
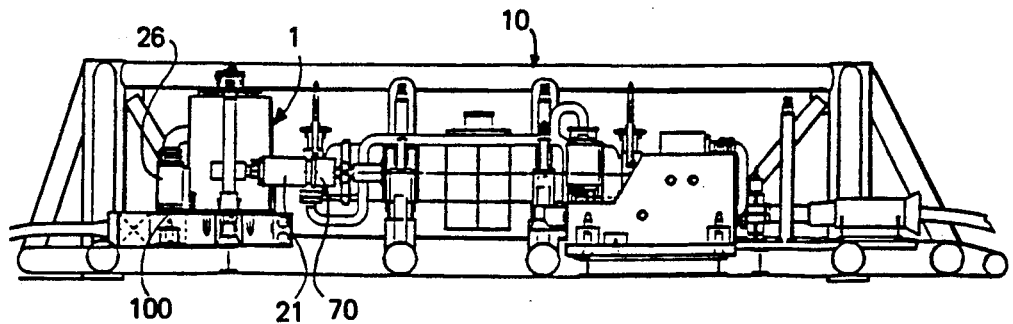
FIG. 14 is a side view of the pod or module of FIGS. 1–3 in place in a subsea installation.
Figure 15:
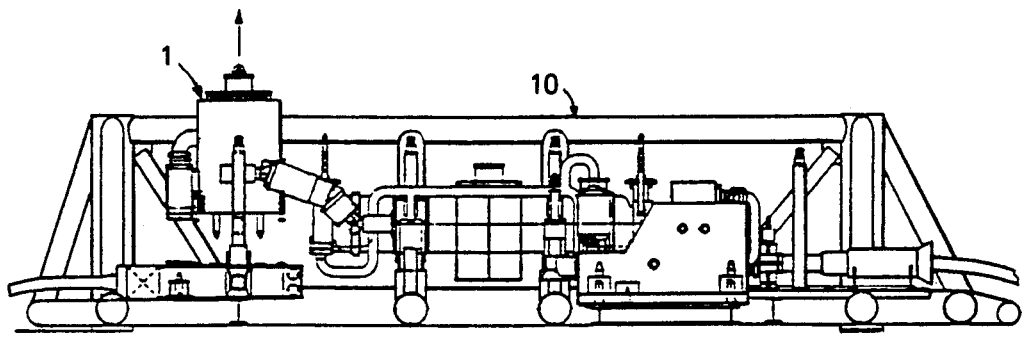
FIGS. 15 and 16 are views similar to FIG. 14 but showing successive stages in an emergency separation of the pod or module from the subsea installation.
Figure 16:
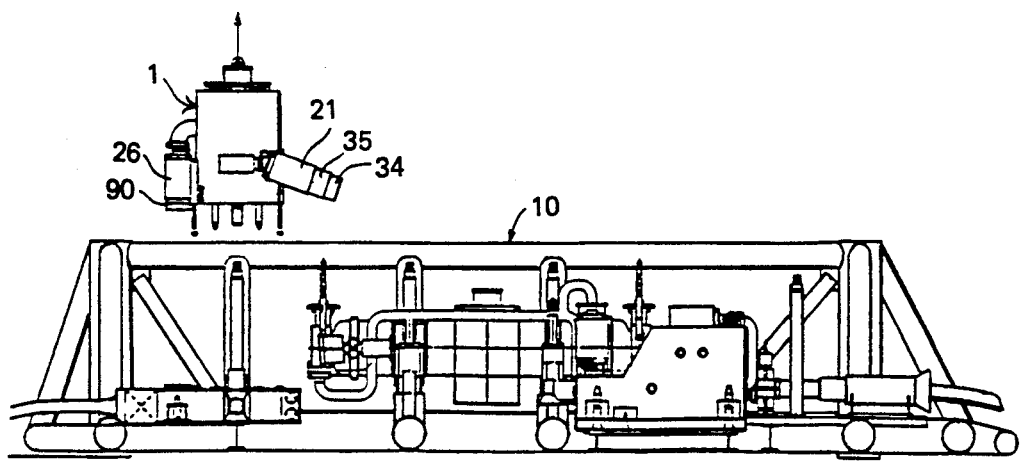

The module 1 is arranged for interfacing electrical and hydraulic supplies and electrical communication to an electrically driven pump unit forming part of a subsea installation 10 shown in FIGS. 14–16. The module 1 makes connection with the electrically driven pump module by way of the connector unit 21 and with an umbilical termination head of the subsea installation by way of the connector unit 26.

As shown in FIGS. 4–7, the connector unit 21 comprises a centrally apertured head plate 30 from which extend spaced concentric inner and outer keeper tubes 31 and 32 of circular cross-section. In the space between the keeper tubes, there are received spaced concentric inner and outer stroking tubes 34 and 35, again of circular cross-section. The inner stroking tube 34 make an interference fit to the inner keeper tube 31 and is closed just short of its outer end by a connector plate 37 through which extend a three-phase power electrical connector element 39, an hydraulic connector element 40 and two electric signal connector elements 41. A flushing outlet 42 is also provided in the plate 37.

The head plate 30 connects to a hollow fitting 45 supported by the member 20 by means of an externally ball jointed end section 46 of the fitting received in the head plate aperture which is correspondingly shaped. The head plate 30 mounts a seal ring 47 sealing the ball joint.

A pin 49 extending radially outwardly from the fitting 45 is received between two bars 50 extending axially from the head plate 30 to maintain the angular relationship of the head plate and the fitting about their common axis. Connecting cables such as illustrated cable 51 extend through the fitting 45 from the casing 2 and the member 20 to the connector elements on the connector plate 37, and a flushing line 52 extends to the outlet 42 from a duct in the head plate 30 leading to a flushing fluid supply.

The inner stroking tube has axially spaced external ridges 55,56 around it by which it is sealed to the outer stroking tube 35. External ridges 59,60 around the outer stroking tube 35 at its inner end and at about the middle of the axial length effect seals to the outer keeper tube 32, and an inwardly extending ridge 61 of the outer keeper tube provides a seal to the outer stroking tube at about its center region but inwardly of the ridge 60. Opposite the ridge 60, a further ridge 62 extending inwardly from the outer stroking tube 35 seals against the inner stroking tube 34.

The connector stroking unit 21 co-operates with a connector receptacle 70 mounted on the pump module and comprising a floor plate 71 carried on the pump module frame 72 by a universal joint 74. Fluid and electrical connector elements indicated generally by reference numeral 75 and corresponding in number and position to the connector elements extend through the floor plate 71, as does a drainhole 77. Extending away from the floor plate 71 is an inner sleeve portion 80 of the receptacle from which extends a portion 81 of larger internal diameter so that an outwardly facing annular step 82 is formed between the portions. The portion 81 has an outwardly flared funnel portion 84 at its outer end. A keybed 85 is provided along the portion for cooperation with a key 86 carried externally by the inner stroking tube 34 at its outer end.

The stroking operation begins when the module 1 has been landed on the subsea installation to juxtapose the connector unit 21 to the receptacle 70 approximately as shown in FIG. 4. The unit and receptacle may be only very approximately in axial alignment and may be about 100 mm. apart. Hydraulic pressure of the order of 1500 p.s.i. is applied to the space between the head plate 30 and the inner ends of the stroking tubes 34 and 35 through a fluid pressure port (not shown), so as to advance the stroking tubes towards the receptacle. The pressure fluid tends to separate the inner stroking and keeper tubes to permit this movement. The outer end of the outer stroking tube 35 is inwardly flared, and if the unit 21 and receptacle 70 are not axially aligned, alignment is effected as the stroking tube advances, by engagement of its outer end with the flared portion 84 of the receptacle. The first phase of the stroking operation ends with the outer stroking tube end in engagement with the annular step 82 and the ridges 59,61 in contact. The unit 21 and the receptacle 70 are now axially aligned, any necessary adjustment having been accommodated by the ball joint connection between the fitting 46 and the plate 30, and the universal coupling 74.

At the end of this first stroke, of perhaps about 300 mm., the relative position of the inner and outer stroking tubes 34,35 is such as to expose hydraulic fluid pressure ports (not shown) to allow the hydraulic pressure to advance the inner stroking tube relative to the outer stroking tube. The key 86 and keybed 85 cooperate to ensure correct angular orientation. During the next and final phase of the stroking operation, the connector elements 39-41 are brought into operative engagement with the connector elements 75 as shown in FIG. 5 through a stroke of about 270 mm. The inner stroking tube 34 extends beyond the plate 37 which is accordingly spaced from the floor plate 71.

Seawater will have been forced out of the receptacle 70 through the drain hole 77 as the connector plate 37 moves into it and any seawater remaining is removed by purging with methanol or other suitable purging fluid. The void between the plates 37 and 71, as well as the interior of the connector unit 21 can be filled with a dielectric oil in order to protect the cables and connectors. The interior of the unit 26 is sealed by the interference fit between the tubes 31 and 34.

Figure 10:
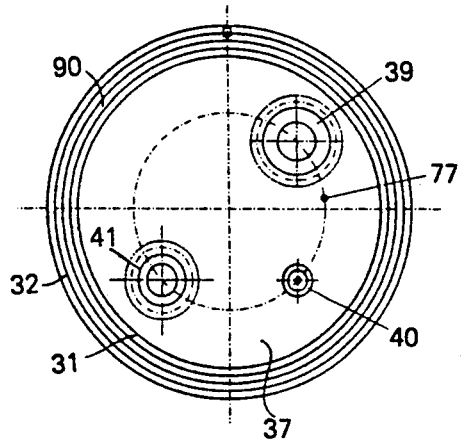
FIGS. 10 and 11 are end views of the opposed ends respectively of the connector unit and receptacle of FIGS. 8 and 9.
Figure 11:
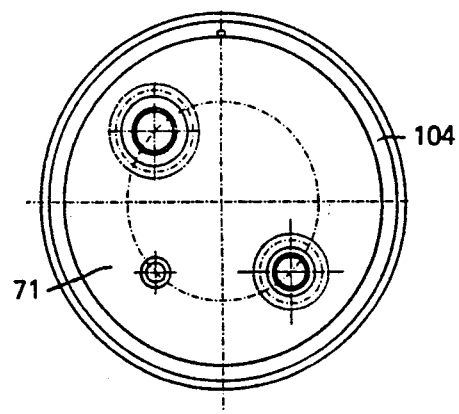
Figure 8:
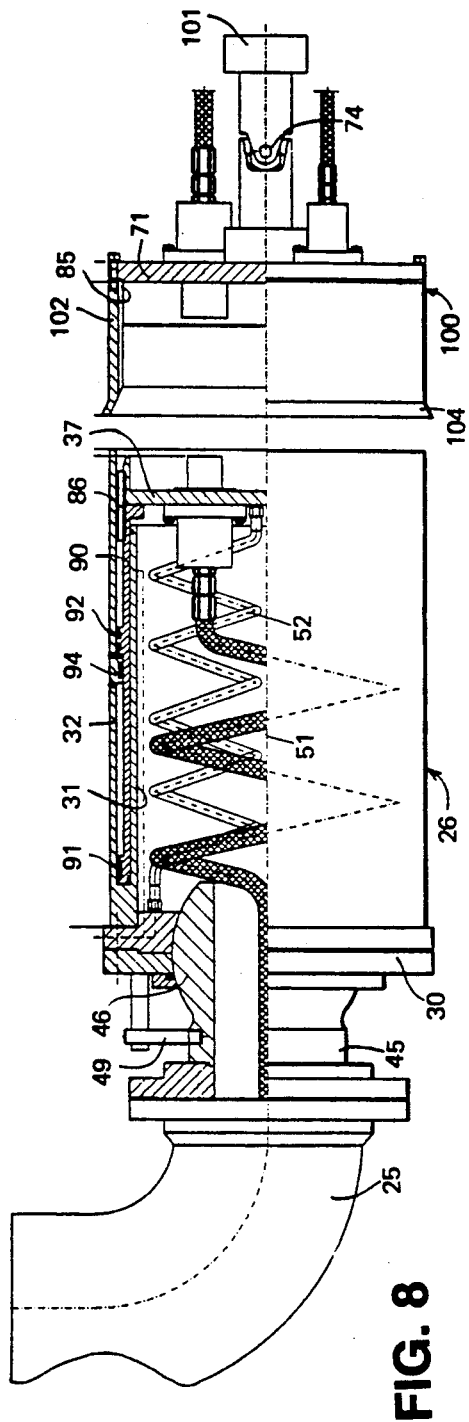
FIGS. 8 and 9 are views similar to those of FIGS. 4 and 5 of the second connection system comprising a second connector stroking unit carried on the module of FIG. 1 and a receptacle supported on the subsea installation.
Figure 9:
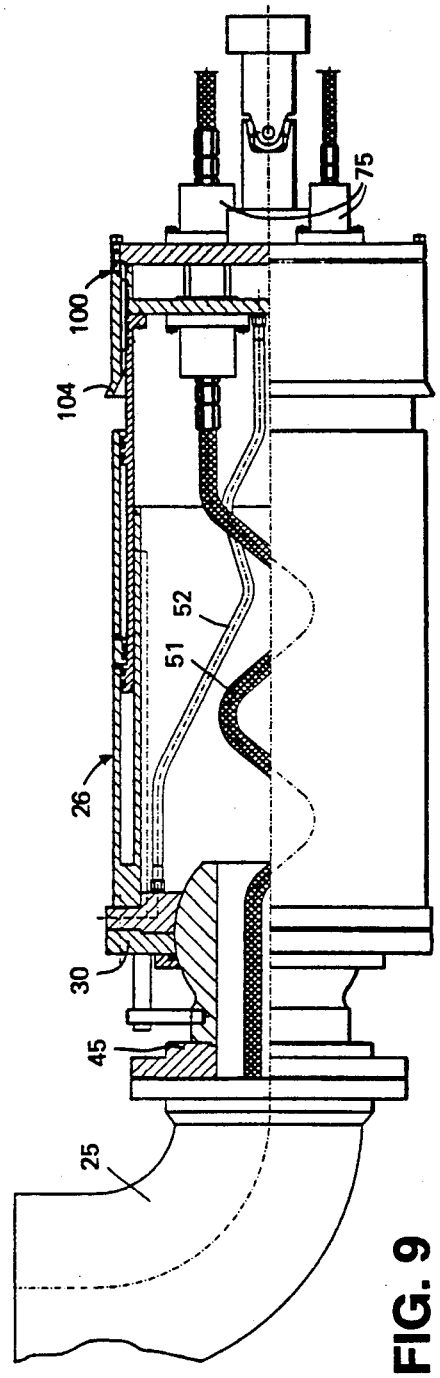

The connector system of FIGS. 9-11 is for establishing connection with an umbilical termination head of the subsea installation 10 and includes a receptacle 100 mounted on the head 101. Because the stroking operation is effected in a generally vertical direction, the stroking connector unit 26 is of less complicated structure than that of the unit 21. Parts of the connector system of FIGS. 8-11 which are identical or functionally equivalent to those of the system of FIGS. 4-7 are indicated by the same reference numerals and will not all be further described.

The stroking unit 26 has, between spaced concentric inner and outer keeper tubes 31 and 32 extending form the head plate 30, only a single stroking tube 90, in sliding engagement with the inner keeper tube. The tube 90 extends slightly axially beyond a connector plate 37 which closes its outer end and carries three connector elements 39-41 and is provided with the drain or flushing outlet 77. The tube is sealed to the outer keeper tube 32 by external ridges 91 and 92 at its inner end and midway along it, respectively. An internal ridge 94 of the tube 32 seals to the stroking tube 90 at a central position, but inwardly of the ridge 92.

The receptacle 100 has a floor plate 71 mounting connector elements 75 for co-operative engagement by the connector elements 39-41 carried by the plate 37. A tubular wall portion 102 extends from the plate 71 to an axially short outwardly flared end portion 104 and mounts a key bed 85 for reception of a key 86 on the stroking tube 90.

In the initial position following landing of the module 1 on the subsea installation 10, as shown in FIG. 8, the connector unit 26 is in at least approximate axial alignment with the receptacle and may be spaced therefrom by around 50 mm. Stroking here is a single phase operation, again effected by application of hydraulic pressure to the inner end of the stroking tube 90 to move this outwardly from between the keeper tubes 31,32. Any slight misalignment between the axes of the unit 26 and the receptacle 100 is corrected by the engagement of the tapered stroking tube end with the outwardly flared receptacle portion 104, the adjustment again being accommodated by the ball joint connection of the unit 26 and the universal coupling 74. Seawater is expelled from the receptacle 100 through the drainhole 77 and the space between the plates 37 and 71 is again flushed with a suitable flushing liquid, to be replaced by oil for protecting the cables and connectors. Thus, in the final position shown in FIG. 9, the outer end of the stroking tube 90 has engaged the floor plate 71, the ridges 91 and 94, are in abutment with the angular orientation about the now common axis of the unit and the receptacle ensured by the key 86 and keybed 85. The connector elements 39-41 have been moved into effective mating engagement with the elements 75.

When the module 1 has been locked down onto the installation 10 by the connector 15 and the connector units 21 and 26 stroked out to establish connections as described, the position is as shown in FIG. 14 and the subsea installation can be set in operation.

The system of FIGS. 12 and 13 comprises a connector stroking unit 110 and a receptacle 120 which again have features in common with the connector systems of FIGS. 4-7, so identical or functionally equivalent parts are again indicated by the same reference numerals and will not all be further described.

The stroking unit 110 is movably mounted on the module 1 by way of a tubular member 111 extending from the module casing sidewall and ending in a centrally apertured joint plate 112. The unit comprises an outer keeper tube 114 of which the inner end is closed by an apertured end plate 115 and is formed to co-operate with the surface of the aperture in the plate 112 to function as a ball joint. An O-ring 116 received within a groove in the joint plate seals to the keeper tube 114 and a scraper ring 117 acting between the rube and the joint plate 112 is retained by an outer ring 119 providing part of the outer ball joint surface.

From the end plate 115 there extends concentrically within the keeper tube 114 a circular cylindrical core member 121 ending just short of the end of the keeper tube. A hollow connector piston 122 with a closed outer end wall 124 surrounds the core member 121 and is movable outwardly along it. The inner end of the piston then makes an interference fit with the outer end of the core member. Between the connector piston 122 and the keeper tube 114, there is received a stroking tube 125 which is slightly spaced from the keeper tube but is sealed to it by an external annular ridge 126 at its inner end and by a second external ridge 127 at about the axial midpoint of the stroking tube. An internally extending annular ridge 129 of the keeper tube provides a seal to the stroking tube axially inwardly of the ridge. The connector piston 122 has an inner portion of reduced diameter extending inwardly from the position of the ridge 127, and an internal annular ridge 130 of the stroking tube 125 seals to the inner portion of the connector piston, which has an external annular ridge 131 nearer its inner end which makes a seal to the stroking tube.

Hoses 135 supply hydraulic pressure fluid through ports in the keeper tube 114 to the spaces between the stroking tube and the keeper tube, and between the stroking tube and the connector piston defined by the various sealing ridges.

The receptacle 120 comprises a floor plate 140 mounted on the subsea installation by means of a universal joint (not shown) and a sleeve 141 extends outwardly from the floor plate to a flared outer end 142. The sleeve 141 has an outer portion of greater diameter than the remaining inner portion, so an annular step 144 is formed between these two portions.

The stroking operation resembles that of the system of FIGS. 4-7 in having a first locating or alignment phase followed by a second phase during which the connections are effected. Fluid pressure is applied to advance the stroking tube 125 and connector piston 122 into the receptacle 120, alignment being effected by the externally tapered outer end of the stroking tube and the flared end portion 142 of the receptacle sleeve. This phase ends when the free end of the stroking tube engages the annular step 144. This movement of the stroking tube has uncovered pressure fluid ports by which the fluid pressure acts on the connector piston 122 to advance this further, into engagement with the floor plate 140 of the receptacle.

The system of FIGS. 12 and 13 differs from the systems previously described in that the piston end wall 124 and the receptacle floor plate 140 do not carry connector elements. Instead, contact means, normally in the form of a plurality of axially spaced contact elements 150, extend partially or completely around the core member 127 at a position near the free end of the unit. The contact elements 150 are mounted on an insulating ring 151 and are connected to an appropriate number of concentric tubular conductors 152 for power supply. The conductors are insulated by sleeves of insulating material around, within, and between them, and extend from the contact elements 150 to terminals 154 located within the tubular member 111. Additional conductors 155 providing communication channels are located within the innermost of the tubular conductors 152 and extend between the contact elements 150 and further terminals 156 within the tubular member 111.

An insulating ring 160 in a recess in the receptacle sleeve 141 supports a corresponding array of axially spaced contact elements 161 from which extend conductors (not shown) into the subsea installation.

Connection between the contact elements 150 of the connector unit and the contact elements 161 of the receptacle is effected by the second stage of the stroking operation by a third array of contact elements 162 exposed externally of the connector piston towards its outer end, which are connected by conductors (not shown) extending through the piston to a fourth array of contact elements 164 exposed at the inner surface of the connector piston near its inner end. The arrays of connector elements 162 and 164 are again set into rings of insulating material. To ensure good electrical contact between the various contact elements, these are advantageously configured as indicated in FIG. 12C, to have a segmental cross-section with the arcuate surface outwardly for sliding movement during the stroking operation and effective eventual engagement with the co-operating contact element.

The partial entry of the connector piston 122 into the receptacle 120 during the first phase of the stroking operation expels some seawater from the receptacle and flushing is effected prior to the second phase of the stroking operation to expel seawater completely. A suitable flushing fluid is supplied for the purpose through a duct 165 extending along the axis of the core member 121. When the stroking operation has been completed, the contacts are flushed by fluid conveyed along a duct 166 extending along the core member.

Separation of the module 1 from the installation 10 is normally effected after retraction into the units 21 and 26 of the stroking tubes 34, 35 and 90. If in a fault condition, the tube 90 cannot be withdrawn, separation can be effected without difficulty because of the vertical movement of the module, and even if retraction of the tubes 34, 35 is prevented, the module can still be simply lifted out of the installation, without damage to either the module or the installation, as illustrated in FIGS. 15 and 16.

From the installed position shown in FIG. 14, the module 1 is lifted by a cable connected to the release loop 16. Tension in the cable first releases the lockdown connector 15 and then causes upward movement of the module. The connector unit 26 is pulled directly upwardly from the receptacle 100 but the unit 21 and the receptacle 70 remain for some time axially in alignment thanks to the ball joint connection and the universal joint 74 which can allow pivotation through some 20–40 degrees. Eventually the pivoting afforded by the ball joint connection reaches its limit and the unit and receptacle separate as shown in FIG. 15. The receptacle 70 then falls back to the initial near-horizontal position, in which it is supported by a cradle as shown in FIG. 16. The module 1 can now move freely upwardly, with the stroking tubes 34, 35 and 90 still protruding from the units 21 and 26.

The invention can of course be embodied in a variety of ways other than as specifically described.

I claim:

1. A system for establishing electrical and/or hydraulic communication between two underwater units, the system comprising a connection device on one of the units, the connection device including a connection member which can be projected from the device, a receptacle on the other of the units for receiving the projected connection member therein, co-operable connector means on the connection member and in the receptacle for establishing the electrical and/or hydraulic communication when the connection member is projected into the receptacle, projection means in the connection device for projecting the connection member therefrom, and alignment means arranged to effect alignment of the connection device and the receptacle along the direction of projection of the connection member, the alignment means comprising mounting means pivotally mounted each of the connection device and the receptacle on the respective one of the units.

2. A system as claimed in claim 1 wherein the unit carrying the receptacle comprises a submerged installation unit and the unit carrying the connection unit comprises a module unit loaded on the installation unit.

3. A system for establishing electrical and/or hydraulic communication at a submerged installation unit, the system comprising:

a module unit arranged to be loaded on the installation unit, connection equipment having a part mounted on one of the module and the installation unit and a receptacle for said part on the other of the module and the installation unit, the parts being adapted to be releasably connectable together to establish the electrical and/or hydraulic communication in the loaded position of the module by stroking movement of the part generally horizontally into the receptacle, and mounting means mounting the part and the receptacle on the module and on the installation unit for pivotation about parallel horizontal axes, thereby permitting separation of the part from the receptacle on lifting the module unit from the installation unit.

4. A system as claimed in claim 3, wherein each mounting means comprises a ball and socket joint or a universal coupling.

5. A system for establishing at least one of electrical and hydraulic communication between two underwater units, the system comprising:

a connection device on one of said units,
a receptacle on the other of said units, connection means in said connection device adapted to be extended from said connection device for reception in said receptacle, co-operable connector elements on said connection means and in said receptacle respectively for establishing said communication when said connection means is received within said receptacle, said connection device comprising concentric inner and outer sleeves having said connection means slidably received therebetween, and at least one supply line communicating said one unit with said connector element on said connection means.

6. A system of claim 5 wherein said connection means comprises relatively slidable first and second portions, said first portion being movable into said receptacle initially to effect alignment of said connection device and said receptacle, and said second portion being movable into said receptacle after alignment has been effected, said connector element on said connection means being on said second portion.

7. A system for establishing electrical and/or hydraulic communication between two underwater units, said system comprising:

a connection device on one of the units, said connection device comprising concentric inner and outer sleeves, a connection member adapted to be projected from said connection device, said connection member comprising tubular means slidably received between said inner and outer sleeves, and an end plate at the outer end of said tubular means, a receptacle on the other of said units for receiving said projected connection member therein, co-operable connector means on said connection member and in said receptacle for establishing said electrical and/or hydraulic communication when said connection member is projected into said receptacle, and projection means in said connection device for projecting said connection member therefrom.

8. A system as claimed in claim 7, wherein the tubular means comprises a single tube slidingly sealed to the inner and outer tubes.

9. A system as claimed in claim 7, wherein the tubular means comprises an outer tube slidingly sealed to the outer sleeve and an inner tube slidingly sealed to the outer tube and the inner sleeve, and having the end plate secured thereto, and wherein stops operative between the outer sleeve and the outer tube limit projection of the outer tube to a position at which the outer tube has effected the alignment of the support and the receptacle, the inner tube being projectable beyond this position to establish the electrical and/or hydraulic communication.

10. A system for establishing at least one of electrical and hydraulic communication between two underwater units, said system comprising:

a connection device, said connection device comprising a connector member which can be projected from said connection device, and projecting means for projecting said connection member from said connection device, a receptacle adapted to receive the connection member when projected from said projection device, first connector means within said receptacle, and mounting means mounting said connection device on one of said underwater units and said receptacle on the other of said units, said mounting means permitting relative movement of said connecting device and said receptacle into alignment, said connection member comprising a sleeve, a plunger concentrically and slidably received within said sleeve, and second connector means on said plunger, said second connector means being engageable with said first connector means to establish said at least one communication between said units, and said projection means being adapted to project said sleeve into said receptacle initially to effect alignment of said connecting device and said receptacle and to project said plunger into said receptacle after said alignment has been effected to establish said at least one communication.

11. The system of claim 10 further comprising step means within said receptacle, said step means being engageable by said sleeve prior to projection of said plunger into said receptacle beyond said step means.

12. The system of claim 10 wherein said receptacle has a floor, said first connector means is located on said floor, said plunger has an end face and said second connector means is located on said end face.

13. The system of claim 12 wherein said plunger is hollow and contains flexible connection lines connected to said second connector means.

14. The system of claim 10 wherein said receptacle and said plunger have respective side walls, said first and second connector means being located at said side walls.

15. The system of claim 10 further comprising drainage means for drainage of water from said receptacle during said projection of said connection member into said receptacle.

16. The system of claim 15 further comprising means for flushing said receptacle after projection of said connection member into said receptacle.

17. The system of claim 10 wherein said mounting means permit pivotation of at least one of said connection device and said receptacle.

18. The system of claim 17 wherein said mounting means comprise one of a ball-and-socket joint and a universal coupling.

19. In a system for establishing at least one of electrical and hydraulic communication between a first underwater unit and a second underwater unit, said second underwater unit being adapted to be vertically lowered into, and to be vertically lifted from adjacency with said first underwater unit;

a connection device on one of said first and second underwater units, said connection device comprising a connection member, said connection member having an outer end region, means guiding said connection member for projection in a non-vertical direction from said connection device with said outer end region leading, and means selectively operable to effect said projection, a receptacle on the other of said first and second underwater units, said receptacle having an aperture and an inner end region spaced inwardly of said aperture and being adapted to receive said projected connection member therewithin with said connection member outer end region juxtaposed to said receptacle inner end region, co-operable connector elements at said connection member outer end region and said receptacle inner end region respectively, said co-operable connector elements being adapted to establish said at least one communication when said connection member outer end region is juxtaposed to said receptacle inner end region, and means pivotably mounting said connection device and said receptacle on said one and on said other of said first and second underwater units respectively, said mounting means permitting withdrawal of said connection member from said receptacle in said projected position of said connection member on said vertical lifting of said second underwater unit.

* * * * *